Nov. 25, 1958 S. W. BUBRISKI 2,862,155
ELECTROLYTIC CAPACITORS
Filed Sept. 17, 1953
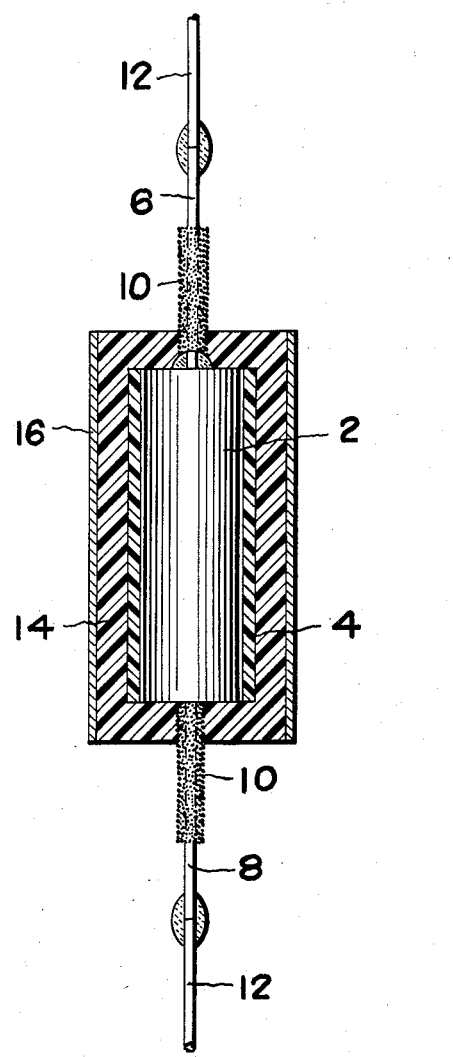
INVENTOR.
STANLEY W. BUBRISKI
BY
HIS ATTORNEYS United States Patent Office 2,862,155
Patented Nov. 25, 1958

2,862,155

ELECTROLYTIC CAPACITORS

Stanley W. Bubriski, Williamstown, Mass., assignor to Sprague Electric Company, North Adams, Mass., a corporation of Massachusetts Application September 17, 1953, Serial No. 380,825

5 Claims. (Cl. 317—230)

This invention relates to new and improved miniature components and more particularly to miniaturized electrolytic capacitors of low voltage requirements susceptible to wide temperature ranges of operation.

The advent of transistor electronics has aggravated the previously increasing demand for miniaturized components. In this field of electronics the components are being subjected to relatively low potentials with the imposed requirement that they be of extremely small size so that large numbers of components could be incorporated into the extremely complex electronic mechanisms now in present day usage. This miniaturization has brought about extreme difficulty with electrolytic capacitors in which electrolytic solutions must be maintained within the confines of these relatively small structures and in particular the amount of electrolytic solution needed therefor is so minute that the egress or loss of a minute volume will make the structure inoperative. Additionally, these miniaturized components must, to reduce their volumes, have relatively thin walls which further complicates retainment while still retaining simplicity of structure, all of which brings about extreme problems which are not satisfactorily answered with presently known structures.

It is an object of the present invention to overcome the foregoing and related disadvantages of the presently known miniature electrolytic capacitors. It is a further object of this invention to produce a new and improved miniaturized electrolytic capacitor having extremely long life and which is susceptible to being operated over an extremely wide temperature range. Further objects of this invention will become apparent from the following description and appended claims.

The objects of this invention have been achieved by the fabrication of a miniature electrolytic capacitor comprising a tantalum foil electrolytic capacitor section containing an aqueous electrolyte, oxide coated tantalum lead wires extended from said electrolytic capacitor section, an epoxy resin totally encasing said capacitor section, said resin hermetically bonded to said terminal wire, and an outer tubular metal casing enclosing a major portion of said resinous casing and bonded thereto.

More particularly, the objects have been attained by an electrolytic capacitor comprising a tantalum foil electrolytic capacitor section, electrolyte impregnated in said section, oxide coated tantalum terminal wires extending axially in opposed directions from said section, an epoxy resin bonding said terminal wires and enclosing said capacitor section and an outer metal can bonded to and enclosing said resinous casing. The preferred structures feature a particular type of epoxy resin, the reaction product of a diphenol and a diglycidyl ether of a diphenol which is catalyzed by an organic amine and the utilization of a weakly acid electrolyte and resin having a weekly alkaline pH.

It has been found that the epoxy resin adheres well to the tantalum oxide coated lead wire which has been utilized for my electrolytic capacitor construction. This unusual adherence of the epoxy resin for the oxide coated terminal wire was thought remarkable in that all previous teachings of welding and other means of bonding non-metallic and metallic structures to tantalum were characterized by the thesis that the tantalum oxide film should be removed from the surface of the tantalum prior to bonding. This unusual adherence of the resin for the oxide film contributes part of the characteristics which result in my capacitor construction exhibiting remarkable properties over previously known structures. In the utilization of this peculiar type resin it was noticed that the hardener formed a gelatinous mass with the electrolyte which is believed thus to assist in the maintaining of the electrolyte within the capacitor structure during molding, which feature further contributes to my structure. Finally, it is well-known that the epoxy resins have very large temperature coefficients of expansion and that these coefficients of expansion are normally overcome by incorporation of filler materials which drastically lowers its expansive properties. In conducting work prior to the discovery of my inventive structure, the cast epoxy (either filled or unfilled) about the component did not offer all the properties believed necessary in the miniature component and it was not until a metal tube was placed about the cast structure that my device exhibited an ability to operate successfully over a wide range of temperatures, namely from —65° C. to +85° C. It is most difficult to determine which of the above features contributed to the remarkable miniature component which I am disclosing in this specification, and it is believed that all have cooperated to yield the preferred embodiment of this novel structure.

To best understand my invention reference is made to the drawing, a cross-section of my miniature electrolytic component, in which the numeral 2 indicates the tantalum foil capacitor section containing an aqueous electrolyte. About this section is wrapped a polyethylene terephthalate adhesive tape 4 to retain the rolled section during casting of the resin about the section. Terminal wires 6 and 8 extend axially in opposed directions from the capacitor section and are shown at 10 to have an oxide of tantalum upon their respective surfaces. The ends of the leads 6 and 8 are butt welded to other leads 12 and the surface of the tantalum is cleaned of the oxide prior to welding. The epoxy resin is indicated by 14 and encompasses the entire capacitor and serves as a bonding medium for the terminal wires 6 and 8 and the outer tube 16 which serves to limit the expansion of the resin and at the same time protects against outside physical blows.

Of recent years a new class of resins exhibiting exceptional adhesion to metal bonding has appeared upon the horizon of plastic materials known as the epoxy resin and are fully described in an article entitled "Ethoxylines: What They Are and Where They Are Going" by E. Preiswerk and J. Charlton, published in Modern Plastics, 28, 85–88 (November 1950). This class of resins was found to be moderately successful with my device, however, it was not until a peculiar type of epoxy resin, namely the reaction product of a diphenol and diglycidyl ether of a diphenol catalyzed with an organic amine, was utilized that the remarkable characteristics of my preferred embodiment became positive. Apparently, the hardener used in this resinous reaction forms a gelatinous structure with the aqueous electrolyte utilized by the tantalum capacitor section, thus preventing any leakage of the electrolyte during the 2 to 20 minutes casting period usually employed. During the casting the exothermic polymerization of the resin develops an appreciable temperature rise that tends to facilitate leakage. The gelatinous structure is believed to result from the utilization of high molecular weight amines as the catalytic resin-forming agent.

Representative amines of this type includes poly-n-vinyl amine and polyethylene polyamines such as diethylene triamine, triethylene tetramine, tetra ethylene pentamine, penta ethylene hexamine and higher homologs. As an example of this reaction .81 of a mol of 4,4'-dihydroxy diphenyl dimethyl methane is reacted with 1 mol of the diglycidyl ether of the diphenol and catalyzed by 1.2% of hexamethylene tetramine. The reaction mixture rapidly hardened and was immobile within a period of ten minutes. For further reference to the preferred class of epoxy resins see United States Patent No. 2,506,486, issued May 2, 1950, to Bender et al.

The reaction heat sometimes results in localized centers of excessive temperature with bubbles or otherwise weakened structure resulting. The addition of a small percentage (1 to 5%) of an anti-foaming agent such as a silicone, octanol-2, 2-ethyl hexanol, ethyloleate, and water soluble polar-non-polar compounds, prevents the bubbling of the resin insuring complete durable hermetic sealing of the encased compound. In the absence of an addition of the antifoamant unit, final product rejects of about ten percent, a substantial percentage, have been found to result.

A further class of resinous materials which exhibit remarkable adhesion for metal and non-metal surfaces and thus serve as excellent metal-to-non-metal seals is the linear aromatic polyphosphates which are exemplified by the reaction of the product of phenol and phosphorus oxy chloride with a dihydroxy phenol to yield a resin having the recurring structure:

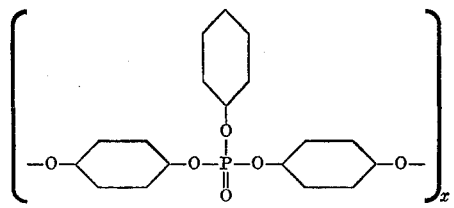

Such resins are described in the Zentfman et al. paper appearing on page 374 of the November 1952, issue of British Plastics.

Further requirements which assist in the selection of an epoxy resin for utilization with my preferred embodiment is that the curing time of the resin must be quite short so as to prevent exposure of the electrolyte to elevated temperatures of long duration and that the curing temperature of the resin be only slightly elevated from room temperature. It also appears that when the residual pH of the resin is weakly alkaline, a weakly acid electrolyte, exhibits much less inhibition of the resin polymerization so that the casting effectiveness is not diminished by the presence of the water. The resin preferably should form a gelatinous interface with any residual electrolyte which remains on the impregnated unit so as to prevent loss of electrolyte which would otherwise lead to inoperability, instability, and excessive power factor, depending upon the magnitude of the loss.

As previously discussed, the exterior metal tube cooperates with the other elements of my invention to yield this miniature capacitor having these exceptional properties. The preferred structure utilizes a tin plated copper tube. However, the only requirement is that the metal tube suffers an intimate bond to the encasing resin while exhibiting a coefficient of expansion substantially less than that of the resin so that it develops compressive force upon the resin during operation at elevated temperatures so as to assist in containing the electrolyte within the encased structure.

As an example of this invention, an etched tantalum foil of ½ mil thickness and having a width of ⅛" and a length of ¾" is butt welded to a tantalum wire and thereafter formed in a 10% aqueous solution of ortho phosphoric acid. Formation is carried out at a constant voltage of 4 v. D. C. for approximately 30 minutes. After formation the anode assembly is rinsed and dried. The formed anode is rolled with a cathode of a tantalum foil, having substantially the same dimensions as the anode, separated by two layers of 65 mil thick Benares paper. After the unit is rolled, polyethylene terephthalate adhesive coated polyethylene terephthalate tape is wound about the unit to retain it in shape. An aqueous solution of ethylene glycol and ammonium pentaborate (weight ratio of 10:15:15 in order given) having a pH of 6.0–6.5 is impregnated into the section at a temperature of 95° C. by submersion for 30 minutes at atmospheric pressure. The impregnated units are thereafter laid on an absorptive material to remove most of the excess impregnant. An epoxy resin mixture conforming to that described previously as the preferred system was mixed with a small amount of silicone antifoaming agent after which the rolled structure was submerged in the resin, removed therefrom, and thereafter hardened in an atmosphere of 50 to 60° C. The tantalum lead wires which extend from the anode and the cathode axially from the roll were butt welded to the nickel wire which serves as the extension of the terminal leads. A tin plated copper tube 0.156" in diameter and ⁵⁄₁₆" long was placed about the resin casing after which the unit was completed. This structure yields a 1 mfd. 3 v. tantalum miniaturized capacitor unit and passes a 1000 hours life test at 65° C. The following data shows the electrical characteristics of a number of units which were prepared and the measurements listed were made at 120 cycles alternating current at room temperature.

*1000 hours life test data at 65° C., 1.0 mfd. 3 v. D. C. Ta capacitor*

| Unit No. | Initial | | 250 Hours | | 592 Hours | | 1,000 Hours | |
|---|---|---|---|---|---|---|---|---|
| | Cap. | R×C | Cap. | R×C | Cap. | R×C | Cap. | R×C |
| 1 | 1.31 | 331 | 1.27 | 303 | 1.19 | 346 | 1.11 | 419 |
| 2 | 1.15 | 441 | 1.07 | 403 | 1.03 | 418 | 0.99 | 425 |
| 3 | 1.18 | 342 | 1.20 | 311 | 0.95 | 379 | 0.98 | 330 |
| 4 | 1.25 | 365 | 1.29 | 278 | 1.24 | 288 | 1.25 | 289 |
| 5 | 1.25 | 364 | 1.24 | 332 | 1.22 | 344 | 1.20 | 350 |
| 6 | 1.23 | 376 | 1.15 | 370 | 1.10 | 398 | 1.06 | 418 |
| 7 | 1.17 | 462 | 1.06 | 409 | 1.03 | 401 | 1.04 | 398 |
| 8 | 1.24 | 399 | 1.23 | 347 | 1.19 | 451 | 1.23 | 340 |
| 9 | 1.35 | 319 | 1.42 | 291 | 1.38 | 326 | 1.37 | 347 |
| 10 | 1.23 | 342 | 1.24 | 302 | 1.22 | 310 | 1.24 | 300 |

The miniaturized electrolytic capacitors described above have remarkable characteristics over the temperature range of −65° C. to +85° C. and on subsequent cycling did not exhibit any tendencies to lose their hermetically sealed characteristics. The structures are of extremely small size hence quite suitable for present day requirements.

This invention also includes valve metals in addition to tantalum and though not quite as satisfactory for low temperature high capacity units aluminum, zirconium, niobium, etc. can be used for the formed anode or both foils of the electrolytic assembly. A variation also within the scope of my invention is of the electrolytes which for low temperature includes those that have suitable conductivity at depressed temperatures such as a concentrated solution of ethylene glycol, water, ammonium pentaborate and ammonium acid phosphate, high molar concentrations of lithium chloride in water, organic nitro-substituted phenolates and naphtholates in organic plasticizers, high molar concentrations of alkali metal salts of organic acids in water, etc. Although less effective than the disclosed embodiment are the resin encased components without the metal tube or alternatively a cellulosic tube as paper impregnated with wax, each can be utilized satisfactorily if not operated much above room temperature.

As many apparently widely different embodiments of this invention may be made without departing from the spirit and scope hereof, it is to be understood that the invention is not limited to the specific embodiments hereof except as defined in the appended claims.

What is claimed is:

1. A miniature electrolytic capacitor comprising a tantalum electrolytic capacitance section containing a weakly acid aqueous electrolytic capacitor electrolyte, oxide coated tantalum lead-wires extending from said section, a weakly alkaline epoxy resin totally encasing said section, said resin being hermetically bonded to said lead-wires, and an expansion-constricting metal reinforcing sleeve enclosing said resinous casing and bonded thereto.

2. An electrolytic capacitor comprising a tantalum electrolytic capacitance section, an electrolyte impregnated in said section, oxide coated tantalum terminal wires extending from said section, an epoxy resin cured with from 1 to 5% of an antifoaming agent completely enclosing said section and bonded to said wires, and an expansion-constrictig metal reinforcing sleeve bonded to and enclosing said resinous casing.

3. The device of claim 2, wherein said epoxy resin is the reaction product of a diphenol and a diglycidyl ether of a diphenol.

4. The device of claim 2 wherein the electrolyte is a weakly acidic aqueous solution and the resin is weakly alkaline.

5. The combination of claim 4 in which the resin is hardened by a high molecular weight amine selected from the class consisting of poly-n-vinyl amine and polyethylene polyamines.

References Cited in the file of this patent

UNITED STATES PATENTS

| | | |
|---|---|---|
| 2,282,459 | Deeley | May 12, 1942 |
| 2,285,136 | Abendroth | June 2, 1942 |
| 2,355,788 | Dunleavey | Aug. 15, 1944 |
| 2,506,486 | Bender | May 2, 1950 |
| 2,628,271 | Brafman | Feb. 10, 1953 |
| 2,667,606 | Rood | Jan. 26, 1954 |

OTHER REFERENCES

Electrical Manufacturing, July 1949, pages 78 to 81, 164 and 166.

British Plastics, October 1951, pages 341 to 345.